United States Patent [19]

Sandy et al.

[11] Patent Number: 4,536,107

[45] Date of Patent: Aug. 20, 1985

[54] DRILL BIT

[75] Inventors: Julius W. Sandy, Sycamore; William D. Riebock; Billy J. Bauscher, both of Rockford, all of Ill.

[73] Assignee: Ex-Cell-O Corporation, Troy, Mich.

[21] Appl. No.: 527,590

[22] Filed: Aug. 29, 1983

[51] Int. Cl.[3] ........................ B23B 51/02; B27G 15/00

[52] U.S. Cl. ..................................... 408/214; 408/220; 408/225; 408/230

[58] Field of Search ............... 408/230, 225, 224, 220, 408/219, 214, 210, 201, 195; 144/219; 145/116 R; 411/387

[56] References Cited

U.S. PATENT DOCUMENTS 201,908 4/1878 Brockett ............................. 408/202

248,854 11/1881 Gladwin ............................. 408/214

1,557,900 10/1925 Thompson ...................... 408/224 X 2,936,658 5/1960 Riley .................................. 408/230

*Primary Examiner*—Z. R. Bilinsky

*Attorney, Agent, or Firm*—Edward J. Timmer

[57] ABSTRACT

A self-feeding, self-aligning drill bit includes a working end with a cylindrical portion having a desired cutting diameter and a conical threaded portion extending therefrom terminating in a threaded tip. The diameter of the threaded portion increases from the tip toward the cylindrical portion such that it approaches the diameter of the cylindrical portion at their juncture. One or more flutes extend longitudinally through both the cylindrical portion and the threaded portion to form one or more cutting edges extending at an angle relative to the axis of the drill bit. The threaded portion may include one or more peripheral grooves staggered along the length of the threaded portion to provide additional cutting edges to reduce cutting torque. The threaded portion not only pulls the bit into the workpart but also the cutting edges thereof function to cut a preliminary hole and also cut apart the workpart debris to significantly reduce chip size. The cutting edges of the cylindrical portion cut the finished hole diameter and also reduce chip size.

14 Claims, 11 Drawing Figures

DRILL BIT

FIELD OF THE INVENTION

The present invention relates to drill bits and in particular to a bit construction especially useful for augers and the like.

BACKGROUND OF THE INVENTION

Wood boring bits such as augers are well known and are shown for example in the early Newton et al. U.S. Pat. No. 5,036 issued Mar. 27, 1847; the Whitehouse U.S. Pat. No. 364,153 issued May 31, 1887; the Bailey U.S. Pat. No. 413,159 issued Oct. 22, 1889, the Hoefle U.S. Pat. No. 430,344 issued June 17, 1890 and the Smith U.S. Pat. No. 597,750 issued Jan. 25, 1898.

Typically, these types of wood augers include a spiral shank terminating in a working end having typically for a single spiral bit, one generally axially extending and one radially extending cutting edge and for a double spiral bit, pairs of these cutting edges. The working end terminates in an integral non-cutting screw point or tip of very much smaller diameter than the diameter of the hole cutting edges, the screw point functioning to pull the bit into the workpart and to center the bit. Various problems have been encountered in manufacturing and using such wood augers, not the least of which is the tendency for the small diameter screw tip to break off in service, especially if the tip hits a nail in the wood being bored. Also, typically, the wood debris produced during boring with such augers is in the form of relatively large chips which must be removed from the hole by the spiral shank. As a result, the depth of the spiral is necessarily great to accommodate large size chips and convey them out of the hole. For a particular diameter hole, increases in spiral depth reduce the load bearing (cutting torque) cross-section of the auger, reducing the strength of the auger and sometimes necessitating heat treatment of the tip and spiral shank to provide added strength. When such augers are heat treated, there is a tendency for longitudinal warping which may cause rejection of the auger or which at a minimum requires straightening of the auger, a costly additional manufacturing step.

The Gaskins U.S. Pat. No. 3,824,026 issued July 16, 1974 illustrates an auger having a generally right triangular profiled lead end point on the working end to initiate cutting of the workpiece almost immediately upon contact therewith.

The Oakes U.S. Pat. No. 3,758,222 issued Sept. 11, 1973 describes a single longitudinally fluted bit which includes a series of stepped cylindrical sections increasing progressively in diameter from the tip toward the shank thereof. The single longitudinal flute provides a single cutting edge for each cylindrical section. This type of bit has been attached to the end of a spiral shank to form a so-called wood auger.

SUMMARY OF THE INVENTION

The present invention provides a drill bit construction which is especially useful for wood augers and is especially adapted for powering by an electric or other power drill, although it is not limited thereto. Typically, the drill bit comprises a cylindrical portion having a cutting diameter substantially equal to that of the hole to be bored in the workpiece and a conical threaded portion extending from the cylindrical portion and terminating in a threaded tip. Importantly, the diameter of the threaded portion increases from the tip toward the cylindrical portion and approaches the diameter of the latter at their juncture. Also importantly, one or more flutes extend through the threaded portion and cylindrical portion to form one or more cutting edges on each of such portions extending longitudinally at an angle relative to the axis of the bit. In operation, the threaded portion pulls the bit into the workpiece in a self-feeding effect and the cutting edge thereof cuts a progressively increasing diameter hole in the workpiece. The cutting edge of the cylindrical portion provides the finish cut to obtain a hole with the selected finished diameter.

In a particularly preferred embodiment of the invention, the threaded portion includes multiple circumferential grooves which are staggered in position along the length thereof so that there is a threaded area on the opposite side of the threaded portion from the groove. These grooves function to significantly reduce torque by providing additional cutting edges during cutting without interfering with the self-feeding effect provided by the threaded portion.

In another particularly preferred embodiment, the cutting edge on the cylindrical portion of the bit is oriented at a greater angle away from the bit axis than the cutting edge of the threaded portion to avoid a corkscrewing effect during drilling.

The drill bit of the invention is characterized by numerous advantages. For example, as a result of the diameter of the threaded portion approaching the diameter of the cylindrical portion at their juncture, the threaded portion is stronger and less prone to break during use, providing a bit which can be driven by an electric or other power drill. And, should the bit encounter a nail in the workpiece, the particular working end tends to displace the nail, rather than cut it. The bit of the invention can also be used to increase the size of an existing hole due to the relatively large threaded portion. The drill bit is also self-feeding and self-aligning.

Furthermore, the wood or other workpiece debris provided during drilling is reduced in size by the novel drill bit described. Instead of large chunks or chips of wood, the bit provides small, fine chips more closely resembling sawdust. Specifically, primary and secondary cutting edges through the threaded portion and cylindrical portion cut workpart debris into this fine material. As a result, the spiral grooves or flutes on an auger for example can be less deep and allow a larger cross-section auger body for greater strength. With a stronger auger or other tool body, heat treatment of the shank can be eliminated, reducing cost and avoiding warpage during manufacture.

These and other objects and advantages of the present invention will become apparent from the following detailed description taken with the following drawings.

DESCRIPTION OF PREFERRED EMBODIMENTS

Figure 1:
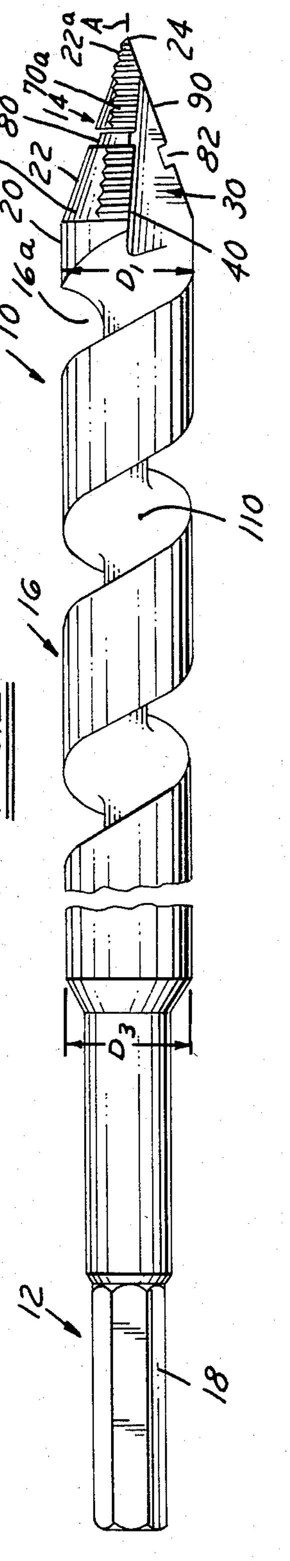
FIG. 1 is a side elevation of a preferred drill bit of the invention.
Figure 2:
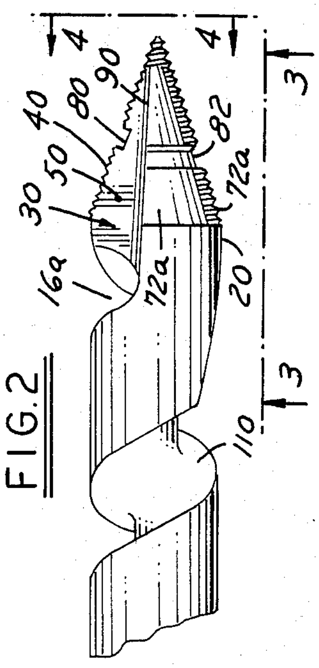
FIG. 2 is a side elevation taken 90° from the view of FIG. 1.
Figure 3:
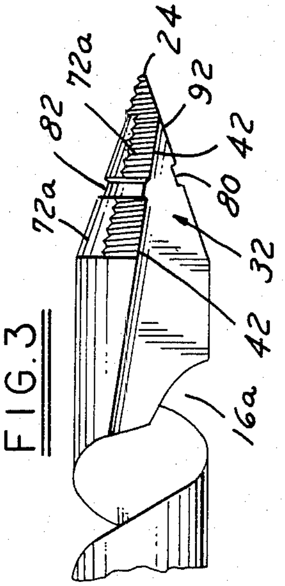
FIG. 3 is a side elevation taken 90° clockwise from the view of FIG. 2.
Figure 4:
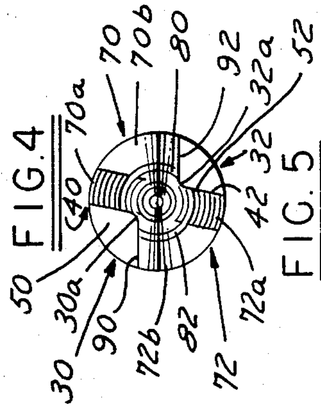
FIG. 4 is a plan view of the working end of the bit of FIG. 3.
Figure 5:
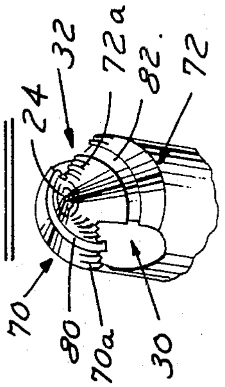
FIG. 5 is an isometric view of the working end of the bit of FIG. 1.

A drill bit of preferred construction according to the invention is shown in FIGS. 1–5 in the form of a wood auger used for boring holes. The drill bit of the invention, however, is not limited to augers and has applicability generally to drill bits of myriad types used to drill or bore holes in a workpart.

The auger 10 shown in the Figures includes a shank end 12, a working end 14 and spiral shank portion 16 therebetween which may be a single spiral (as shown) or a double spiral. The shank end 12 comprises a chuck engaging portion 18 having for example a hexagonal profile or cross-section adapted to be gripped by the chunk of a conventional electric power drill. Of course, the cross-section can be varied as required to be gripped by chucks of other tools.

The working end 14 comprises a cylindrical profiled portion 20 and a threaded conical portion 22 which increases in diameter from the tip 24 toward the cylindrical portion 20, the diameter of the threaded portion 22 approaching that of the cylindrical portion 20 at their juncture. For example, diameter $D_1$ of cylindrical portion 20 is substantially equal to that of the bore to be drilled through the workpart, such as 13/16 inch for an exemplary bit. The maximum diameter of threaded portion 22 at its juncture with the cylindrical portion would preferably be equal to $D_1$. Of course, the maximum diameter could be less than $D_1$ at their juncture, creating a stepped profile at the juncture. However, the maximum diameter preferably is at least 75% of $D_1$ at or near the juncture of the portions 20 and 22.

The threaded portion 22 includes threads 22*a* of a typical size 16 pitch which can be varied as desired depending on the workpart material being drilled, pulling action desired and other factors known to those skilled in the art. The included angle of the threaded conical portion in a typical embodiment is 40° although this can be varied as desired.

As shown in the Figures, the working end 14 includes a first flute 30 and a second flute 32 extending longitudinally at an angle through both the cylindrical portion 20 and threaded portion 22. First flute 30 has an apex 30*a* which extends at an angle of 13° relative to the rotational axis A of the auger as viewed in side elevation of FIG. 1. As is also apparent from FIG. 4, the apex 30*a* is offset from the axis A so that threaded tip 24 is formed at the terminal portion of the threaded portion 22.

The second flute 32 is shown offset from the axis A on the opposite side of the threaded portion from the first flute 30, i.e., 180° therefrom about the circumference of the threaded conical portion. The second flute 32 has an apex 32*a* which extends at an angle of 13° relative to axis A as viewed in FIG. 3 and in the opposite direction from flute 30. That is, first flute 30 extends upwardly from tip 24 relative to FIG. 1 whereas flute 32 extends downwardly relative to the same Figure.

Flutes 30 and 32 define cutting edges 40 and 42 on the working end 14 of the auger extending at an angle of 15° from the respective apex 30*a* or 32*a* as a result of the wall 50 and wall 52 connecting the cutting edges 40 and 42 with the apex of the respective flute being undercut to present a sharp cutting edge to the workpart. The undercut typically is 3°. As is apparent, walls 50 and 52 and cutting edges 40 and 42 (in plan view, FIG. 4) are offset on opposite sides of axis A in substantially parallel planes.

As shown, the flutes 30 and 32 bifurcate the threaded portion 22, except for tip 24, and provide lateral pie-shaped sections 70 and 72. The pie-shaped sections include threaded portions 70*a* and 72*a* continuing from threaded tip 24 and adjacent areas 70*b* and 72*b* which are ground to remove the thread and provide a back-off or back relief to expose the adjacent cutting edges 40 or 42.

Figure 10:
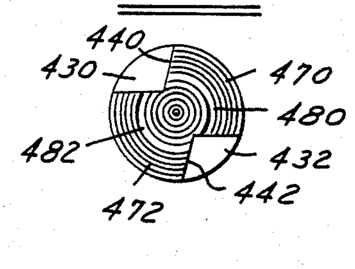
FIG. 10 is a plan view similar to FIG. 4 of an alternate bit having fully threaded pie-shaped sections.
Figure 11:
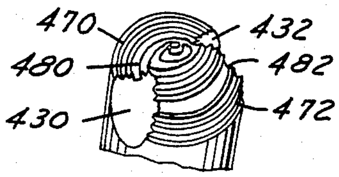
FIG. 11 is an isometric view similar to FIG. 5 of the bit of FIG. 10.

Instead of grinding off the threads, back-off or back relief for the cutting edges 40, 42 can be provided by forming the threads around the entire periphery of each pie-shaped section 70, 72 with a commercially available threading machine manufactured by International Tool & Machine Co., 29 Valley Road, Westport, CT that will impart the desired back relief to the threads as they approach the cutting edges 40, 42. FIGS. 10 and 11 show a bit working end with such fully threaded pie-shaped portions 470, 472 where features like those of FIGS. 105 are represented by like 400 series numbers. Such fully threaded pie-shaped sections 470, 472 with back relief formed during the thread machining process are preferred in the invention.

The sections 70 and 72 also include circumferential grooves 80 and 82 which extend from one flute to the next. Importantly, the grooves 80 and 82 are spaced apart or staggered along the length of the sections 70 and 72. The grooves 80 and 82 have been found to significantly reduce torque during drilling by presenting additional cutting edges to the workpart. By staggering the axial location of the grooves on one pie-shaped section relative to the other, torque can be reduced without interfering substantially with the pulling effect exerted by the pie-shaped sections. That is, on the pie-shaped section opposite the groove, there are threads to continue to pull the bit into the workpart, e.g., see FIG. 1.

In the manufacture of the working end, the features described above can be conveniently provided by a form grinding operation.

During drilling, the working end of the bit produces smaller chips than prior art augers, the chips more closely resembling sawdust than chips. The threaded cutting edges 40*a* and 42*a* of the pie-shaped sections 70 and 72 function to chop up the workpart debris together with secondary debris cutting edges 90 and 92 defined by the flutes 30 and 32, respectively. These secondary cutting edges are located in substantially parallel planes on opposite sides of the centerline of axis A as shown in plan view of FIG. 4.

As a result of the finer size of debris exiting from the flutes 30 and 32 of the working end, the spiral groove 16*a* of spiral portion 16 can be machined to have a reduced depth to accommodate the debris. This allows the web 110 of the spiral portion 16 to have a larger cross-section, providing a higher strength spiral shank portion. And, grinding of the spiral portion 16 can be effected in a single pass on a conventional grinding machine, instead of the two passes previously required.

As known in the past, the spiral shank portion 16 tapers gradually to a small diameter $D_3$ from the working end 14 toward the shank end 12 so that cylindrical portion 20 having the major diameter $D_1$ actually performs the finished hole cutting operation.

Figure 6:
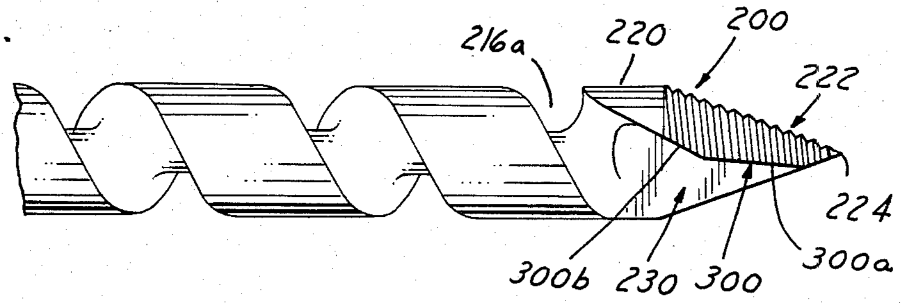
FIG. 6 is a side elevation of another drill bit embodiment of the invention.
Figure 7:
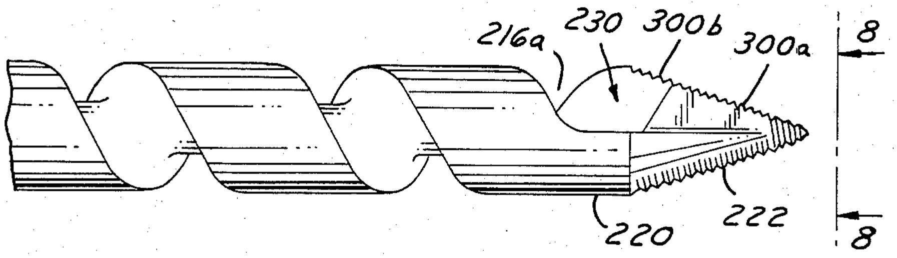
FIG. 7 is a side elevation taken 90° clockwise from the view of FIG. 6.
Figure 8:
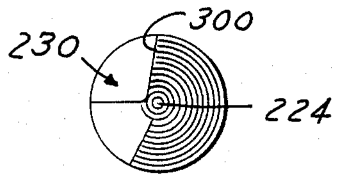
FIG. 8 is a plan view of the working end of the bit of FIG. 8.
Figure 9:
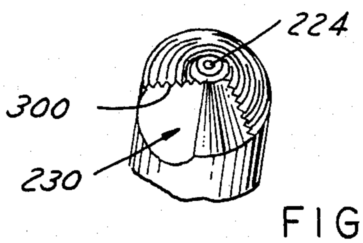
FIG. 9 is an isometric view of the working end of the bit of FIG. 6.

FIGS. 6–8 show another embodiment of the invention wherein the drill bit 200 has only a single flute 230 extending through the working end and does not include peripheral grooves in the threaded portion 222, although they could be present. Furthermore, the cutting edge 300 defined by flute 230 includes a first leading cutting portion 300*a* extending at an angle of 25° relative to axis A and a secondary trailing cutting portion 300*b* extending at a larger angle of 27° relative to axis A. The angle of the leading portion 300*a* is selected to provide optimum self-feeding of the working end into the workpart while the large angle of the trailing portion 300*b* is selected to minimize corkscrewing of the bit during drilling. In other respects, the bit is similar to that described above with respect to FIGS. 1–4 and like features are represented by like 200 series reference numerals. Of course, instead of grinding off the threads, back-off for cutting edge 300 can be provided by forming threads around the entire periphery with the thread forming machine referred to above with respect to FIGS. 10 and 11 and this is preferred.

While there has been described what is herein considered to be certain specific and preferred embodiments of the invention, changes and modifications thereto may occur to those skilled in the art and it is intended to cover in the appended claims all other changes and modifications as fall within the spirit and scope of the invention.

We claim:

1. A drill bit for drilling a hole of selected diameter in a workpiece, said bit having a working end comprising a cylindrical portion with a selected cutting diameter and a conical threaded portion extending from the cylindrical portion and terminating in a tip, the diameter of the threaded portion increasing from the tip toward the cylindrical portion and approaching the diameter of the cylindrical portion at their juncture, said working end including at least one flute means through the threaded portion and through the cylindrical portion forming a longitudinally extending cutting edge and another edge on the threaded portion and on the cylindrical portion, whereby said threaded portion pulls the bit into the workpiece in a self-feeding effect while the cutting edge thereof cuts a progressively increasing diameter hole in the workpiece and the cutting edge of said cylindrical portion provides the finish cut for the final selected diameter hole, said conical threaded portion having peripheral threads extending from the cutting edge around said conical threaded portion except for said flute means with said threads reduced in height or eliminated adjacent said another edge.

2. The drill bit of claim 1 wherein said cutting edge includes a leading edge extending longitudinally at a first angle relative to said axis and a trailing edge extending longitudinally at a second angle greater than said first angle relative to said axis.

3. The drill bit of claim 1 wherein said flute means forms a secondary chip cutting edge extending longitudinally through the cylindrical portion and threaded portion in a plane offset from said axis.

4. The drill bit of claim 1 wherein the threaded portion includes a circumferential groove intersecting and extending from said flute means to reduce torque during drilling, said groove having a depth greater than that of the threads on the threaded portion.

5. The drill bit of claim 4 wherein the groove extends only partially around the threaded portion so that the pulling effect of said threaded portion is not interrupted.

6. The drill bit of claim 1 wherein the diameters of the threaded portion and cylindrical portion are substantially equal at their juncture.

7. A wood auger having the drill bit of claim 1.

8. A drill bit for drilling a hole of selected diameter in a workpiece, said bit having a working end comprising a cylindrical portion with a selected cutting diameter and a conical threaded portion extending from the cylindrical portion and terminating in a threaded tip, the diameter of the threaded portion increasing from the tip toward the cylindrical portion and approaching the diameter of the cylindrical portion at their juncture, said working end including a first flute and second flute spaced apart on the periphery thereof to form a first cutting edge and second cutting edge in the threaded portion and cylindrical portion extending longitudinally at an angle relative to the axis of the bit and in opposite directions and forming spaced apart threaded first and second pie-shaped sections on said threaded portion, each pie-shaped section having a circumferential groove extending between said first flute and said second flute with the groove in said first section and the groove in said second section being axially staggered and spaced apart relative to one another along the conical threaded portion to reduce torque during drilling without substantially interrupting the pulling effect of the threaded portion into the workpiece, that portion of said first and second cutting edges in said threaded portion cutting a hole of progressively increasing diameter in the workpiece and that portion of said first and second cutting edges in said cylindrical portion cutting the finished hole diameter.

9. The drill bit of claim 8 wherein said first cutting edge and second cutting edge each include a leading edge extending longitudinally at a first angle relative to said axis and a trailing edge extending longitudinally at a second angle greater than said first angle relative to said axis.

10. The drill bit of claim 8 wherein said first cutting edge and second cutting edge extend longitudinally through the threaded portion and cylindrical portion in substantially parallel planes offset on opposite sides of said axis.

11. The drill bit of claim 8 wherein said first flute and second flute each form a secondary chip cutting edge extending longitudinally through the threaded portion and cylindrical portion in substantially parallel planes offset on opposite sides of said axis.

12. The drill bit of claim 10 wherein the diameters of the threaded portion and cylindrical portion are substantially equal at their juncture.

13. The drill bit of claim 10 wherein the threaded pie-shaped sections are disposed on opposite sides of the threaded portion.

14. A wood auger including the drill bit of claim 8.

* * * * *